United States Patent
Esterby et al.

(10) Patent No.: US 6,647,332 B1
(45) Date of Patent: Nov. 11, 2003

(54) ELECTRONIC INCHING CONTROL STRATEGY

(75) Inventors: James D. Esterby, Peoria, IL (US); Jeffrey T. Ryan, Washington, IL (US); Douglas L. Sloan, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/219,503

(22) Filed: Dec. 21, 1998

(51) Int. Cl.[7] .......................... G06F 17/00; G06F 19/00; B60K 41/22; F16D 67/00
(52) U.S. Cl. ............................. 701/51; 701/67; 701/68; 192/3.58; 192/3.57; 192/3.54; 192/58.6; 192/58.63; 192/32; 477/76
(58) Field of Search ............................... 701/67, 51, 68; 192/3.58, 3.54, 3.57, 58.6, 58.63, 32; 477/76, 87

(56) References Cited

U.S. PATENT DOCUMENTS

| | | | |
|---|---|---|---|
| 4,199,048 A | * 4/1980 | Ishikawa | 192/52 |
| 4,643,285 A | * 2/1987 | Horsch | 192/87.13 |
| 4,678,069 A | * 7/1987 | Yoshimura et al. | 192/33 |
| 4,781,080 A | * 11/1988 | Iwatsuki | 477/161 |
| 4,790,420 A | * 12/1988 | Hata et al. | 192/111 |
| 4,865,176 A | * 9/1989 | Blake et al. | 192/3.63 |
| 4,979,599 A | * 12/1990 | Nishida | 192/32 |
| 4,982,622 A | 1/1991 | Yamamoto et al. | 74/866 |
| 4,987,982 A | * 1/1991 | Yamaguchi | 192/3.57 |
| 5,069,084 A | 12/1991 | Matsuno et al. | 74/844 |
| 5,101,943 A | * 4/1992 | Bulgrien | 192/3.63 |
| 5,311,974 A | * 5/1994 | Rueb | 192/3.57 |
| 5,438,887 A | 8/1995 | Simmons | 74/335 |
| 5,450,768 A | 9/1995 | Bulgrien et al. | 74/336 |
| 5,456,333 A | * 10/1995 | Brandt et al. | 180/336 |
| 5,464,085 A | * 11/1995 | Churchill | 192/85 |
| 5,520,593 A | 5/1996 | Yesel et al. | 477/77 |
| 5,537,886 A | * 7/1996 | Toyama | 74/336 |
| 5,587,905 A | 12/1996 | Yesel et al. | 364/424.82 |
| 5,613,581 A | * 3/1997 | Fonkalsrud et al. | 192/3.23 |
| 5,722,912 A | * 3/1998 | Narita | 477/64 |
| 5,957,260 A | * 9/1999 | Kunii | 392/85 R |
| 6,007,453 A | * 12/1999 | Ohkuma et al. | 477/76 |
| 6,102,829 A | * 8/2000 | Muddell et al. | 477/77 |

* cited by examiner

*Primary Examiner*—William A. Cuchlinski, Jr.
*Assistant Examiner*—Brian J Broadhead
(74) *Attorney, Agent, or Firm*—W Bryan McPherson; Clifton G Green; Kelsey L Milman

(57) ABSTRACT

The present invention provides a method and apparatus for controlling the pressure of an actuating fluid flowing through an inching clutch. The invention includes the steps of determining an actual pressure of the actuating fluid, establishing an inching pressure threshold, comparing the actual pressure with the threshold, and controlling the actual pressure in response to the comparison. In one embodiment, the pressure is controlled using a first control algorithm in response to the fluid pressure being less than an inching threshold, and using a second control algorithm in response to the pressure being greater than or equal to the inching threshold.

10 Claims, 4 Drawing Sheets

ELECTRONIC INCHING CONTROL STRATEGY

TECHNICAL FIELD

The present invention relates generally to a transmission control strategy and more particularly to a method and apparatus for controlling the fluid pressure of an inching clutch.

BACKGROUND OF THE INVENTION

Transmissions on earth moving machines, such as track type tractors and motorgraders, have many different gear ratios that are each provided by engaging certain ones of a plurality of fluid actuated clutches. These clutches are normally engaged by directing pressurized fluid through respective pressure modulation valves that are likewise controlled by electronic clutch pressure control valves. The electronic clutch pressure control valves are controlled in response to receipt of an electrical signal received from a controller. Many times it is desirable to have a smooth transition from neutral to a gear, for example, when hitching up an implement in a confined space. However, in current systems, when the gears are changed there is a "jerk" when the appropriate clutch is engaged. The "jerk" is due to the inching clutch being filled to slowly or rapidly. The "jerk" leads to operator fatigue and transmission wear.

The present invention is directed to overcoming one or more of the problems set forth above.

DISCLOSURE OF THE INVENTION

In one aspect of the present invention, a method is provided for controlling the pressure of an actuating fluid associated with an inching clutch. The invention includes the steps of determining an actual pressure of the fluid, and responsively controlling the pressure.

In another aspect of the present invention an apparatus for controlling the pressure of an actuating fluid flowing through a valve and an inching clutch is disclosed. The apparatus includes a pressure sensing device adapted to sense an actual pressure of the actuating fluid and generate an a pressure signal and a controller adapted to receive the pressure signal, establish an inching pressure threshold, responsively control the pressure of the fluid.

These and other aspects, objects, features and advantages of the present invention will be more clearly understood and appreciated from a review of the following detailed description of the preferred embodiments and appended claims, and by the accompanying drawings.

BEST MODE FOR CARRYING OUT THE INVENTION

Figure 1:
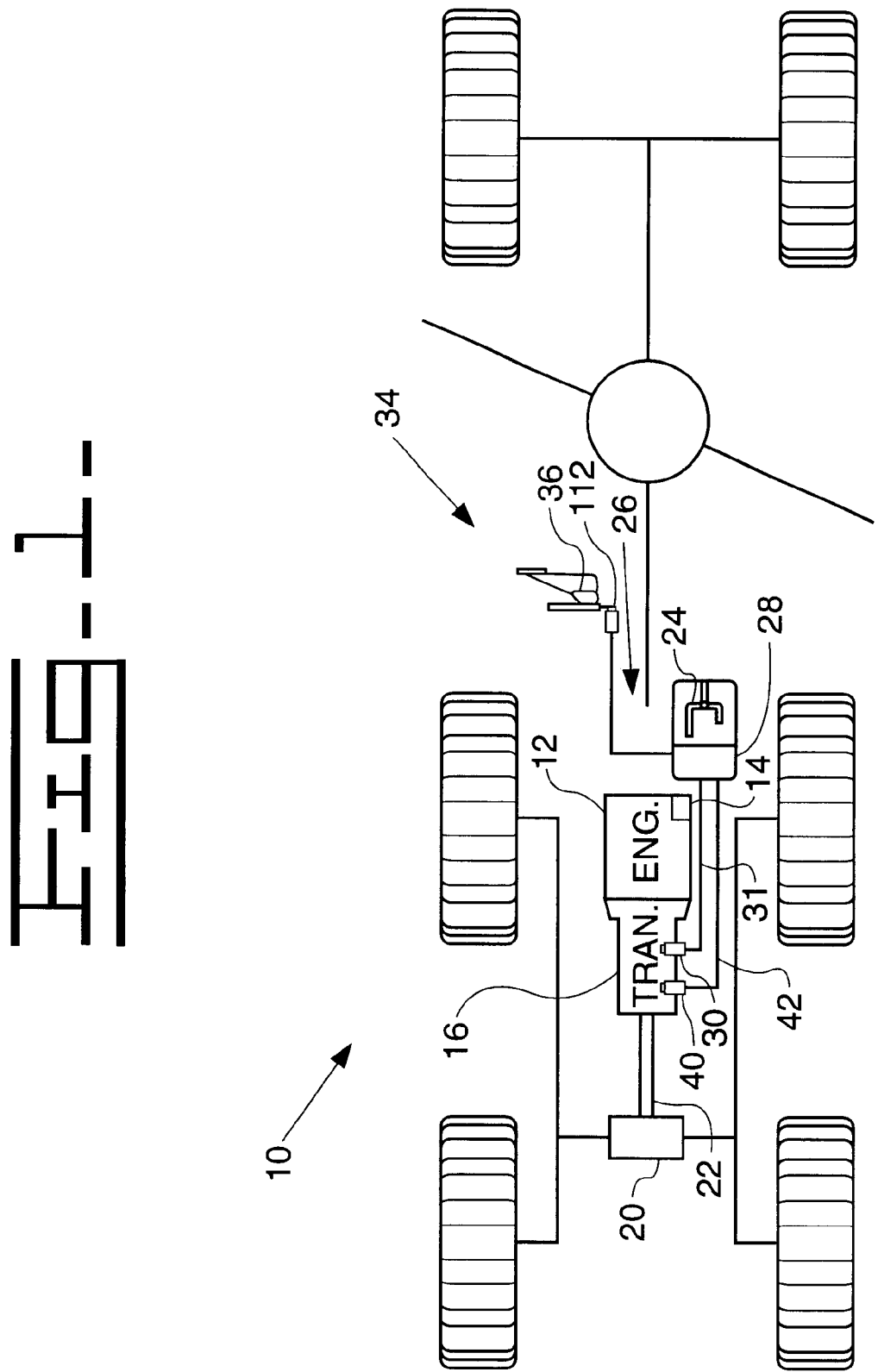
FIG. 1 is a diagrammatic representation of a machine incorporating an embodiment of the present invention.
Figure 2:
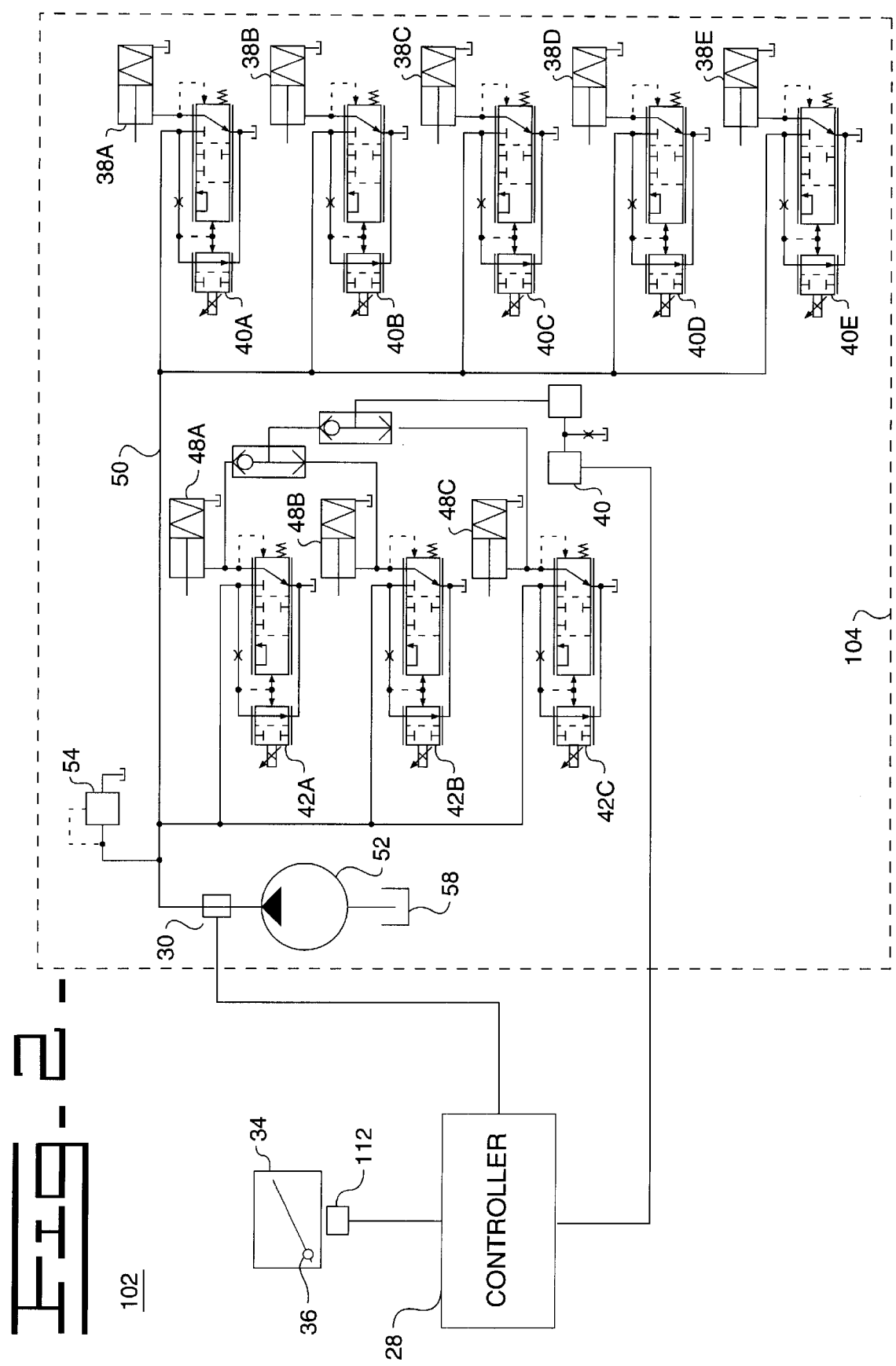
FIG. 2 is a detailed diagrammatic representation of the present invention.

The present invention provides an apparatus and method for controlling the pressure of an actuating fluid flowing through an inching clutch. FIGS. 1 and 2 is an illustration of one embodiment of an inching control system 102 for a transmission 104. In one embodiment the transmission 16 is located on an earth moving machine 10 such as a track type tractor, or motor grader, however, it may be located on other earth moving machines having transmission systems Referring to FIG. 1, an earth moving machine 10, has an engine 12 with an engine throttle control 14 for controlling the engine speed. A transmission 16 is operatively connected to the engine 12 and coupled to a differential gearing 20 by a shaft 22. The transmission output is measured in terms of the speed of rotation of its output shaft 22 in rpm. The transmission 16 of the subject disclosure is an power shift transmission, but it is recognized that other types of fluid drive transmissions could be used. A shift lever 24 is associated with the transmission 16 for shifting the transmission between the neutral position and the various forward and reverse gear ratios.

The transmission 16 has an inching control system 26 that includes a controller 28 that is operative to receive various system parameters and control the transmission in response to the system parameters.

The control system 26 may include an oil operating condition sensor 30 that may be in the form of a temperature sensor or a viscosity sensor. The oil operating condition sensor 30, if used, delivers a signal to the controller 28 through an electrical line 31 that is representative of the operating condition of the oil in the transmission 16. In the preferred embodiment the operating condition is the viscosity of the oil, or a parameter such as temperature, from which viscosity may be determined or estimated.

The control system 26 includes a pressure sensor 40 for sensing the pressure of the actuating fluid. The pressure sensor 40 delivers an actual pressure signal to the controller 28 through an electrical line 42, the signal being representative of the actual pressure of the actuating fluid.

The machine 10 also includes an operator control mechanism 34 that is operatively associated with the controller 28. In the preferred embodiment the operator control mechanism 34 includes a foot pedal 36 that is movable from a 0% percent travel position toward a 100% travel position in response to the operator's desired input. In the preferred embodiment the foot pedal 36 is an inching pedal.

In the preferred embodiment, the control system 26 includes a position sensor 112 for sensing the position of the inching pedal 36. The position sensor 112 senses the position of the pedal 36 and responsively delivers a position signal to the controller 28. The position signal includes information representing the operator's desired inching input.

As more clearly illustrated in FIG. 2, the hydraulic circuit the transmission 16 of FIG. 1 includes a plurality of fluid actuated clutches 38A–E a plurality of pressure modulation valves 40A–E operatively connected to the plurality of fluid actuated clutches 38A–E. In the subject embodiment, the pressure modulation valves 40A–E are each solenoid actuated valves. The transmission control system 26 also includes at least one Electronic Clutch Pressure Control ECPC proportional valve that is operatively associated with the controller 28 and controlled in response to movement of the foot pedal 36. "FIG. 2 illustrates three ECPC valves 42A–C." The ECPC valve 42A–C has an associated clutch 48. The clutch 48A–C associated with the ECPC valve 42A–C is referred to as an inching clutch.

The shift lever 24 illustrate in FIG. 1 may be a multi-contact switch that sends position information to the controller 28 to indicate the desired direction of travel and the desired gear ratio for the transmission 16. In particular, the input from the shift lever 24 is used to determine which clutch 48A–C will be used as the inching clutch. As is known in the art, the appropriate solenoid actuated pressure modulation valves 40A–H operate the corresponding fluid actuated clutches 38A–H and thereby determine the actual travel and gear ratio of the transmission 16.

The schematic shown in FIG. 2 illustrates one embodiment of the inching control system 102 used in conjunction with the hydraulic circuit 104 associated with the transmission 16. The inching control system includes a fluid pump 52 that is operatively connected to the plurality of solenoid actuated pressure modulation valves 40A–E and the ECPC proportional valves 42A–C. The number of modulation valves 40 and ECPC valves 42 shown in FIG. 2 are for exemplary purposes only and should not be read to limit the scope of the present invention. The oil operating condition sensor 30 may be disposed in the supply conduit upstream of the respective proportional valve 42A–C and the plurality of pressure modulation valves 40A–E.

The proportional valve 42 is a proportional valve that control the magnitude of pressure that is provided downstream thereof to the second supply conduit 50.

In one embodiment, which includes an inching pedal 36 to receive the operators desired inching inputs, the inching mode may be activated by pressing the inching pedal 36. When the inching pedal 36 is pressed, the inching clutch 48 starts to drain. As the inching pedal 36 is released, the appropriate ECPC proportional valve 42 increases the inching clutch pressure.

The present invention provides an apparatus and method for controlling the pressure of the actuating fluid flowing through an ECPC valve and the inching clutch 48. In one embodiment, the controller 28 receives the actual pressure signal, establishes an inching pressure threshold, and compares the sensed actual pressure with the inching pressure threshold. The actual fluid pressure is then controlled in response to the comparison. In the preferred embodiment, the controller receives a position signal, which includes information representing the desired inching input, and uses the position signal in conjunction with the comparison to control the actual fluid pressure. In addition, a desired inching clutch pressure may be determined in response to the comparison and the desired inching input. The desired inching clutch pressure is determined based on a first control algorithm when the sensed actual fluid pressure is less than the inching threshold and a second control algorithm when the sensed actual fluid pressure is greater than or equal to the inching threshold. Alternatively, the threshold could be set such that when the sensed actual fluid pressure in less than or equal to the inching threshold, the first control algorithm is used to control the clutch pressure. In one embodiment, the oil condition signal is received by the controller 28 and the associated temperature information is used in conjunction with the pressure and position signal to determine the desired inching clutch pressure.

Figure 3:
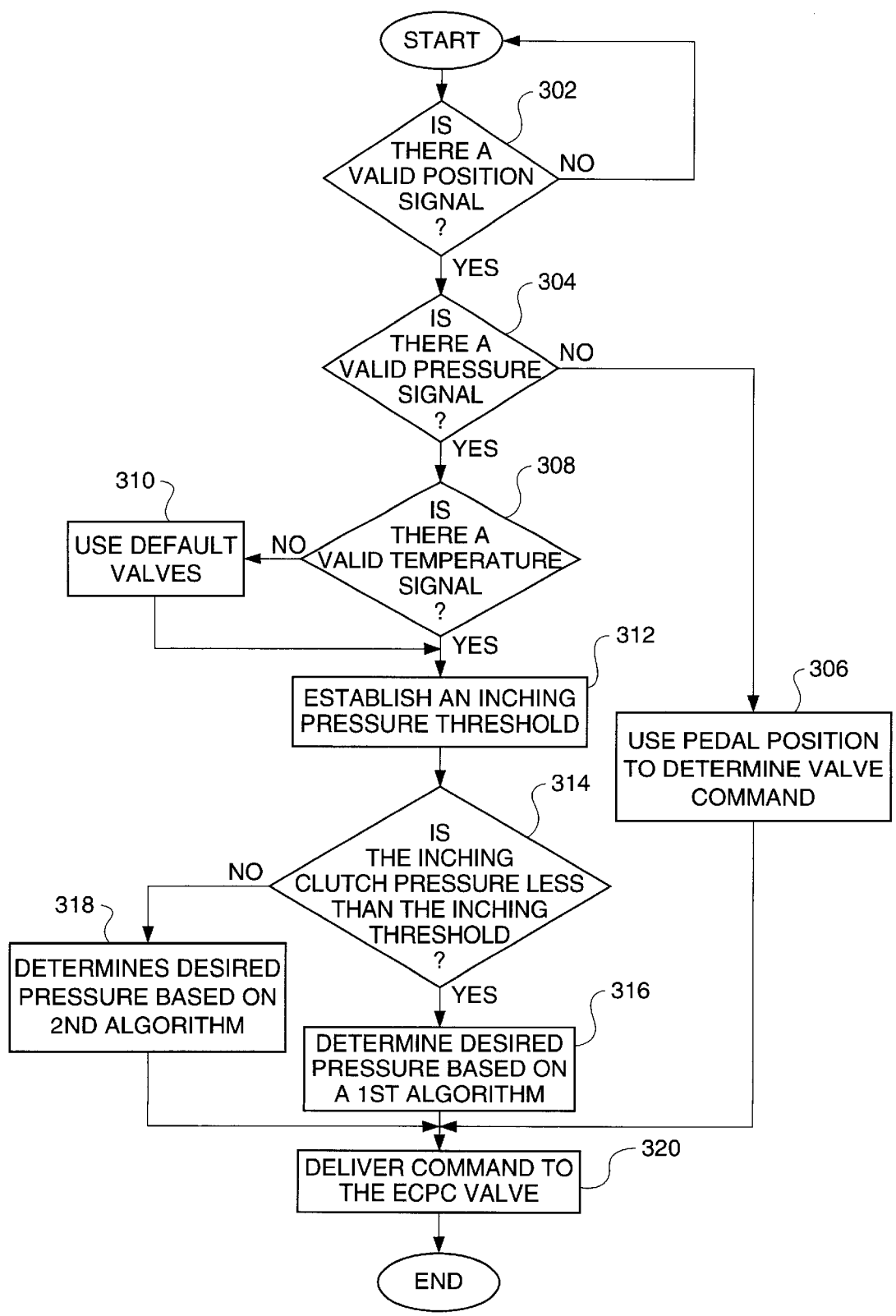
FIG. 3 is a flow chart illustrating the operation of the present invention.

Operation of the inching control system will now be discussed with reference to FIG. 3, which depicts one embodiment of a flowchart representative of the computer program instructions executed by the electronic control module 28 shown in FIGS. 1 and 2. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number. As shown in FIG. 3, the program determines whether the input sensor signals are valid. The program determines whether the position signal received from the position sensor 112 is valid <302>. If the position signal is invalid, then the operator may be notified, and control returns to the beginning of the program.

The program determines whether a valid pressure signal is received from the pressure sensor 40 <304>. If the pressure signal is invalid, then the controller 28 will utilize the inching pedal position to determine the ECPC valve command <306>. In one embodiment, if the inching pedal is not fully released, then the controller 28 may deliver a current command associated with the pedal position or pressure to the ECPC valve solenoid 42. If the inching pedal is fully released, then the transmission operates in a non-inching mode.

The program determines whether a valid temperature signal is received from the temperature sensor 30 <308>. If the temperature signal is invalid, then the controller will respond in the same manner as if a temperature sensor 30 was not used at all. If the temperature signal is invalid, then the proportional, integral, and derivative coefficients of a PID compensator (described below) will be set to a default value. <310> If, however, the temperature signal is valid, then the coefficients will be set based upon the temperature of the actuating fluid. In the one embodiment, the temperature is used to determine a viscosity of the fluid. The viscosity of the fluid may effect the fluid pressure needed to obtain the desired performance. In one embodiment, normal coefficients are used for normal operating temperatures while adjusted coefficients are used for low temperatures. The coefficients are adjusted to compensate for changes in fluid viscosity due to temperature.

An inching pressure threshold is established. <312>. In one embodiment the inching pressure threshold is established by selecting a predetermined value. The threshold is selected in order to provide for precise positioning of the machine with a small changes in pedal position. In an alternative embodiment, the inching pressure threshold may be dynamically determined. For example, the threshold may be a predetermined value that is dynamically modified based on the fluid temperature in order to account for changes in fluid viscosity.

Figure 4:
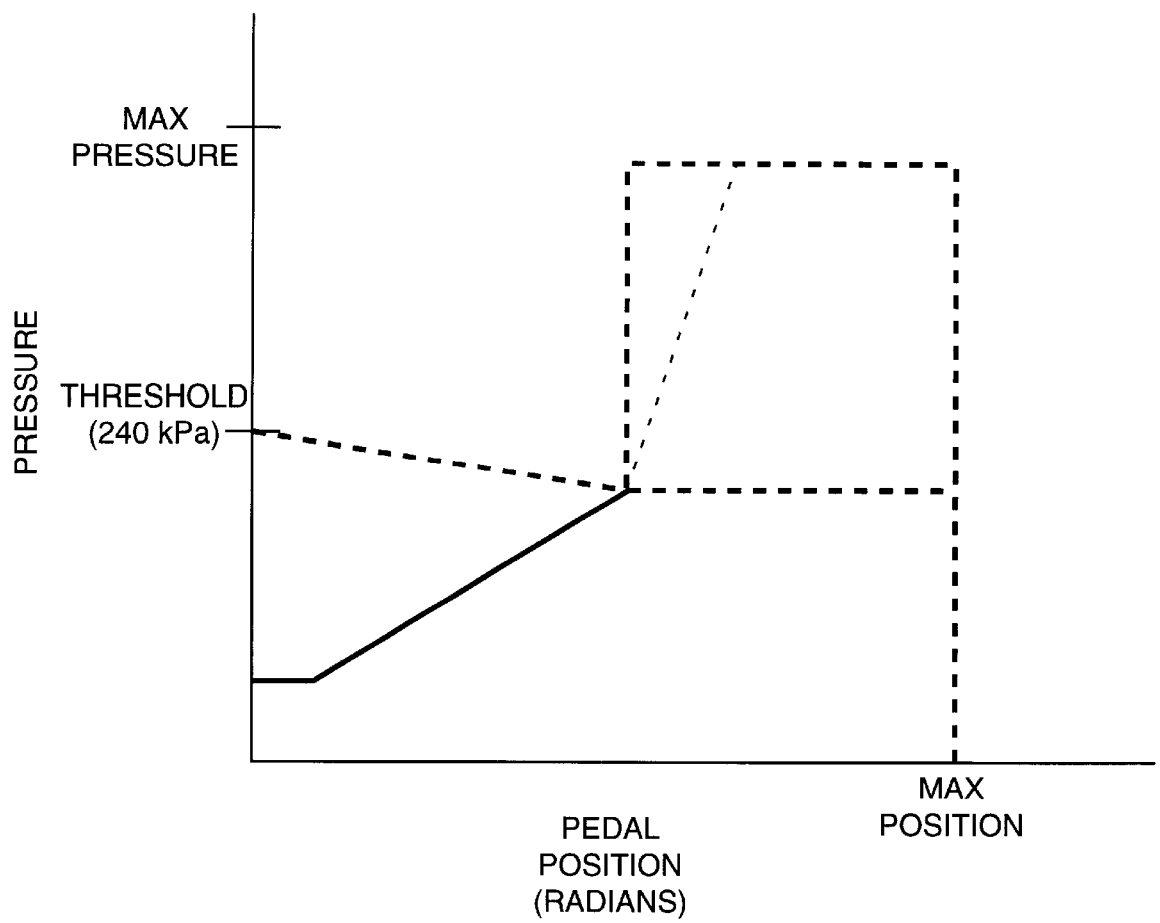
FIG. 4 is a chart representing clutch pressure verses percent of inching pedal travel.

When the sensor inputs have been received and validated and the inching pressure threshold established, the desired inching pressure may be determined. As the inching pedal 36 is released, the ECPC valve 42 is commanded by the controller 28 to increase the inching clutch pressure <312>. As the inching pedal 36 is released, the pressure of the actuating fluid is sensed (determined). If the fluid pressure is below an inching threshold, then the controller 28 determines the ECPC valve command in response to a first algorithm <314>. The first algorithm determines the valve command based on the pedal position in order to increase the inching clutch pressure. The first algorithm determines a valve command that is proportional to the pedal position. FIG. 4 is an example of a graph of pedal position and clutch pressure. One example of the inching pressure threshold may be 240 kPaG. If the actual pressure is below the inching threshold, then the desired pressure is compared with the actual pressure to determine a pressure error, where the desired pressure is directly proportional to the pedal position. The pressure error is then delivered to a PID compensator. An example of a PID compensator is illustrated below:

$$\text{Position} = K_{P1}*e_A + K_{D1}*\Delta e_A + K_{I1}*\theta e_A$$

Where:
- $K_{P1}$ is a proportional gain value
- $e_A$ is the pressure error
- $K_{D1}$ is the derivative gain value
- $\Delta e_A$ is the rate of change of the pressure
- $K_{I1}$ is the integral gain value
- $\theta e_A$ is an integral factor, and is provided so that a steady state control signal is produced after the pressure error has gone to zero.

The proportional, integral, and derivative gain factors used in the compensator may be based upon the temperature of the fluid. If a temperature sensor is not used then default values may be used for the gain factors. As discussed above, in one embodiment, default coefficients are used for normal operating temperatures while adjusted coefficients are used for low and high temperatures. The PID compensator generates an proportional valve position command corresponding to the inching pedal position.

If the fluid pressure is equal to or greater than the inching threshold then the controller 28 will use a second algorithm to determine the ECPC valve command <318>. In the preferred embodiment, the second algorithm uses a ramp-up routine to determine the proportional valve command. In the preferred embodiment, the ramp-up routine is a routine that, given the fluid pressure remains above the threshold value, the fluid pressure will ramp up to a maximum value, regardless of pedal position (assuming pedal position does not go below threshold), as illustrated in FIG. 4.

Industrial Applicability

The present invention provides a method and apparatus for controlling the pressure of an actuating fluid flowing through an inching clutch. The invention includes the steps of determining an actual pressure of the actuating fluid, establishing an inching pressure threshold, comparing the actual pressure with the threshold, and controlling the actual pressure in response to the comparison. In one embodiment, the pressure is controlled using a first control algorithm in response to the fluid pressure being less than an inching threshold, and using a second control algorithm in response to the pressure being greater than or equal to the inching threshold. In the preferred embodiment a desired inching input is determined based on the inching pedal position. If the inching pedal position is associated with a pressure below the inching threshold, the desired inching input is compared with actual clutch pressure. The comparison may be used by a PID compensator to determine an ECPC valve current command. The ECPC valve current command is then delivered to the ECPC valve to enable the appropriate amount of fluid pressure to actuate the inching clutch <320>.

If the inching pedal position is associated with a pressure equal to or above the inching threshold, then a ramp up routine will be used to determine the ECPC valve current command. The ramp up routine is such that the maximum clutch pressure may be achieved in a short period of time, e.g., one to two seconds.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications and that such changes do not depart from the true spirit and scope of the invention.

What is claimed is:

1. A method for controlling an actual pressure of an actuating fluid flowing through a valve and an inching clutch, comprising the steps of:
   - determining an actual pressure of the fluid;
   - determining a desired inching input;
   - establishing an inching pressure threshold;
   - comparing said actual pressure with said threshold; and
   - electronically controlling the actual pressure in response to said comparison and said inching input.

2. A method, as set forth in claim 1, wherein the step of controlling the actual pressure includes the steps of:
   - determining a desired inching pressure in response to said comparison and said inching input; and
   - delivering a command to said valve in response to said desired inching pressure.

3. A method, as set forth in claim 2, wherein the step of controlling the pressure further includes the steps of selecting one of a first and second algorithm to control the pressure in response to said comparison.

4. A method, as set forth in claim 3, wherein the step of selecting one of a fist and second algorithm further includes the steps of:
   - selecting said first control algorithm in response to said actual pressure being less than said threshold; and
   - selecting said second control algorithm in response to said actual pressure being one of greater than and equal to said threshold.

5. A method, as set forth in claim 4, wherein the step of determining a desired inching input further comprises the steps of:
   - determining a position of an inching pedal; and
   - determining said input in response to said pedal position.

6. A method, as set forth in claim 5, wherein said first control algorithm determines a desired fluid pressure in response to said desired inching input.

7. A method, as set forth in claim 6, including the step of determining a viscosity of said fluid wherein at least one of said first and said second control algorithm determines a desired fluid pressure in response to said viscosity.

8. A method, as set forth in claim 7, wherein the step of establishing said inching pressure threshold further comprises the step of establishing said inching pressure threshold by establishing said inching threshold is predetermined value.

9. An apparatus for controlling the pressure of an actuating fluid flowing through a valve and an inching clutch comprising:
   - a pressure sensing device adapted to sense an actual pressure of the actuating fluid and generate an a pressure signal; and
   - a controller adapted to receive said pressure signal, establish an inching pressure threshold, compare said actual pressure with said threshold and responsively generate a valve command signal, thereby controlling the pressure of the fluid, wherein said controller selects one of a first and a second algorithm to determine said valve command in response to said comparison.

10. An apparatus, as set forth in claim 9, further comprising:
    - an inching input device adapted to generate a desired inching input signal;
    - wherein said controller receives said inching input signal, correlates said inching input with a preliminary desired pressure, compares said preliminary desired pressure with said threshold, selects said one of said first and said second control algorithm in response to comparison, and responsively generates said valve command.

* * * * *

UNITED STATES PATENT AND TRADEMARK OFFICE
CERTIFICATE OF CORRECTION

PATENT NO. : 6,647,332 B1
DATED : November 11, 2003
INVENTOR(S) : James D. Esterby et al.

It is certified that error appears in the above-identified patent and that said Letters Patent is hereby corrected as shown below:

Column 6,
Line 41, insert -- a -- before "predetermined value."
Line 47, delete "an" after "generate"

Signed and Sealed this

Second Day of March, 2004

JON W. DUDAS
*Acting Director of the United States Patent and Trademark Office*